United States Patent

[11] 3,608,490

| [72] | Inventor | John D. O'Keefe<br>Seal Beach, Calif. |
|---|---|---|
| [21] | Appl. No. | 676,819 |
| [22] | Filed | Oct. 20, 1967 |
| [45] | Patented | Sept. 28, 1971 |
| [73] | Assignee | North American Rockwell Corporation |

[54] POROUS MATERIALS
4 Claims, 5 Drawing Figs.

[52] U.S. Cl..................................................... 102/24,
29/421, 29/486
[51] Int. Cl..................................................... B23p 3/09
[50] Field of Search.......................................... 29/486, 47,
421 E; 102/24

[56] References Cited
UNITED STATES PATENTS

| 3,137,937 | 6/1964 | Cowan et al. | 29/486 |
| 3,360,848 | 1/1968 | Saia | 29/47 |
| 3,380,908 | 4/1968 | Kensuke Ono et al. | 204/90 |

Primary Examiner—Robert F. Stahl
Attorneys—William R. Lane, Allan Rothenberg and Richard D. Seibel ABSTRACT: Energizing of materials having a high degree of porosity by passing a high energy shock therethrough is described. Much of the energy of the shock is inelastically converted to thermal energy of the porous material thereby greatly increasing its temperature and pressure. The hot, high pressure material is used for welding two solid bodies together in one embodiment and in another is employed to accelerate a plate to high velocity. Multiple layers of such porous material having low density alternating with high density layers with monotonic changes in thickness of both sets of layers provides an amplification of pressure of a shock for accelerating a plate to very high velocity.

INVENTOR.
JOHN D. O'KEEFE
BY Richard D. Seibel
ATTORNEY

F I G 4
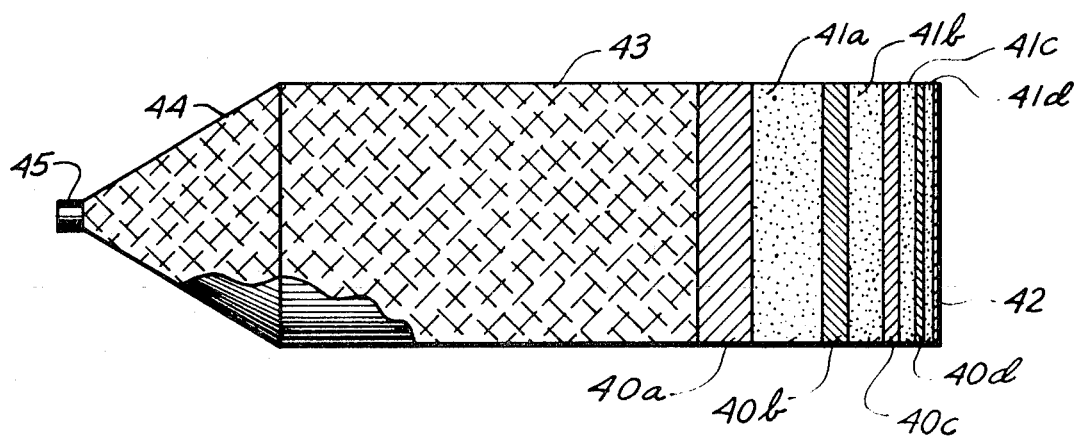
F I G 5
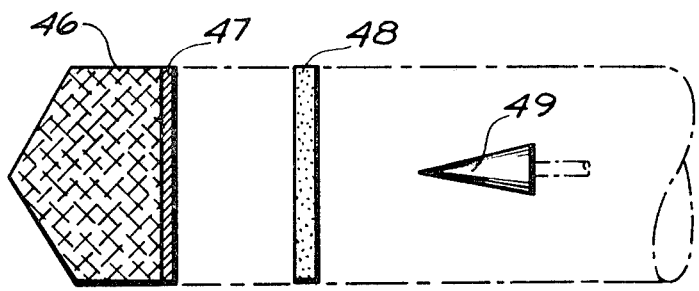
INVENTOR.
JOHN D. O'KEEFE
BY Richard D. Seibel
ATTORNEY

3,608,490

POROUS MATERIALS

BACKGROUND

In many modern situations it is desirable to generate high temperatures and pressures in materials for many applications. Thus, for example, it may be desirable to generate a high temperature welding. It may also be desirable to generate high pressures for accelerating projectiles to high velocities. It may also be of interest to study materials themselves at elevated temperatures and pressures for theoretical purposes. Such theoretical data is of considerable significance in defining equations of state for various materials.

Often the high temperatures and pressures desired are only required for relatively short periods of time and transient phenomena can be employed. In fact, in many instances the extremes of temperature and pressure are so high that only transient attainment of the condition are possible. Thus, it has become the practice to employ explosive apparatus of various sorts for generating shock waves which, in interacting with materials, produce elevated temperatures and pressures. The peak pressures and temperatures achievable with conventional explosive techniques may not be sufficient for studying equations of state under extreme conditions.

Similarly conventional explosive techniques for bonding materials have not proved completely satisfactory and reliable high strength bonds are not consistently demonstrated.

BRIEF SUMMARY OF THE INVENTION

Thus, there is provided in the practice of this invention according to a preferred embodiment means for generating high temperature in a material having a substantial amount of finely divided pore space therein by passing a high energy shock wave therethrough. Preferably the shock is transmitted to the porous material from a body having a high-shock impedance such as a metal.

Objects and many attendant advantages of this invention will be readily appreciated as the same becomes better understood by reference to the following detailed description when considered in connection with the accompanying drawings wherein:

FIG. 4 illustrates another embodiment for accelerating a plate to very high velocity; and FIG. 5 illustrates schematically an embodiment for employing a vaporized porous material for high enthalpy gas flow.

It has been found in the practice of this invention that heating of porous materials by passage of a shock wave therethrough can be utilized for welding solid materials together and for generating extremely high pressures for determining equations of state.

Figure 1:
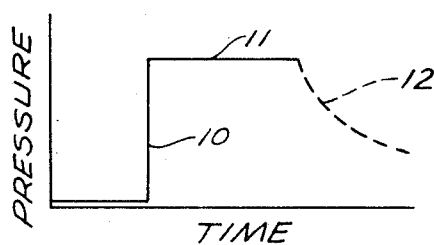
FIG. 1 illustrates schematically the pressure characteristics of a typical shock wave.

Generally, passage of a shock wave through a material can be considered in the manner represented schematically in FIG. 1, wherein pressure is plotted as a function of time. As illustrated therein, the pressure remains at some initial value in a given element of material until arrival of a shock, which can be represented by a vertical line 10 representing a substantially instantaneous rise in pressure at the shock interface. The pressure behind the shock interface, that is at a very short moment in time after passage of the shock front 10, may be extremely high. The peak pressure may persist for a short time interval after passage of the shock front. After a short time at a substantially constant value 11, the pressure drops off rather rapidly along a steep curve 12 characteristic of a particular material through which the shock is propagating. In general, for a shock created by explosives, the peak pressure is determined by the nature of the explosive and the duration of peak pressure is determined by the quantity of explosive. Broadly, the total energy of the shock can be related to the area under the pressure-time curve.

In the case of a flat interface between an explosive and a metal plate, the peak pressure obtained behind the shock is in the order of 250 kilobars (that is, about 250,000 atmospheres). The energy represented by this increase in pressure goes principally into potential energy of the lattice in the solid material, that is in elastic deformation of the solid. This results in a substantial increase in the density of the solid material as compared with the original bulk density. Thus, for example, in solid aluminum, the ratio of the volume of an element of material subjected to such a pressure over the original volume, may be as low as 0.8. That is, a body of aluminum is compressed to 80 percent of its original volume in the small region behind the shock and the density is concomitantly increased.

In a porous material, on the other hand, there is considerably less elastic deformation of the lattice and the density is often not increased appreciably above the bulk density or density of the solid material without pores. Instead the energy of the shock is converted into thermal energy of the molecules, thereby elevating the temperature of the material. The work that is done in deforming the porous material is the pressure times the volume change and most of this work is inelastic and converted to thermal energy due to the frictional forces involved in the compression.

The degree of porosity in the solid material has a substantial effect on the temperature achieved. A convenient measure of the degree of porosity is the ration of the volume of porous material to the volume of a like quantity of solid material. Thus, for example, a material having a porosity of 2 has a density one-half of that of the solid material or occupies a volume twice that of a similar quantity of solid material. The porous materials referred to herein may comprise solids having small holes or pore spaces therein. However, such materials are not readily prepared with sufficiently high degrees of porosity and a more convenient way of obtaining a porous solid is by use of a powder wherein the pore spaces are between individual particles of solid materials. In order to obtain high degrees of porosity, it is necessary to employ very fine powders. Thus, in order to achieve a porosity of 4, it is necessary to employ powder in the size range of about 5 to 20 microns. A porosity of 6 can be obtained with 1 micron particles. Lower porosity can be obtained with somewhat larger particles or can also be obtained by compacting smaller powders, which, when loosely packed, give higher porosities. Thus, in the materials considered herein the pore spaces are very small since the particles are very small.

In general it is desired to employ as high a degree of porosity as possible since the temperature achieved is higher for higher porosity. This is the case since the work done is proportional to the volume change from the porous state to the normal bulk density and a greater volume change occurs with the higher porosity, lower density powders than with lower porosity materials. As a practical matter a porosity of about 4 is sufficient to develop sufficient enthalpy in the porous materials for most purposes and such powders are readily available. It is preferred that the porosity be greater than about 2 since below this value the enthalpy developed may be too low to provide sufficient molten or vaporized material for practical application to welding or acceleration of objects.

In general, it is desirable to apply an energizing shock to the porous material by means of a body of solid material such as a metal plate. A shock is initially applied to the metal plate by an explosive arranged on the opposite side thereof from the porous material. The explosive shock may be transmitted through the metal plate without substantial motion thereof and applied directly to porous material immediately adjacent the metal plate. In other circumstances the shock in a porous material may be produced by impacting the metal plate thereon. In either way, only the desired shock is applied to the porous material without interfering effects from the explosion products and the like and the porous material is greatly heated only as a result of the shock passage. In many instances it is desirable to have a mass of solid material adjacent the heated porous material for containment thereof and this is provided by the metal plate that applied the shock to the porous material.

Figure 2:
FIG. 2 illustrates application of principles of this invention to welding.

Thus, in the practice of this invention according to a preferred embodiment, shock wave heating of a porous material may be employed for welding two bodies of solid material together. As illustrated in FIG. 2 a metal plate 15 is mounted on a high inertia body 16 so that the plate 15 is relatively immovable. If the plate 15 is massive it may be that the inertial mass 16 can be eliminated and the plate 15 may be relatively immovable because of its own mass or other constraints. It is preferred that the inertial mass 16 have substantially the same acoustic impedance as the metal plate 15 for minimizing reflected rarefaction waves therefrom.

A continuous layer of metal powder 17 having a thickness many times the particle diameter is provided on the face of the plate 15 and a second metal plate 18 is provided on the opposite side of the porous powder layer 17 from the first metal plate 15. The porous layer does not serve merely as a spacer but provides a locus for heating to cause bonding. The assemblage thus comprises a sandwich of two metal plates with a thin layer of porous metal in the form of powder therebetween. On the opposite side of the second metal plate 18, there is provided a layer of conventional high explosive 19 having associated therewith a conventional detonator 20 for initiating detonation of the explosive. If desired a thin plastic layer may be employed between the explosive and the second plate 18 for protection of the surface thereof.

In the prior art, explosive welding for high strength has required plates angulated relative to each other and driven together or closely spaced apart plates with propagation of the detonation front parallel to the joint therebetween at a velocity less than the sonic velocity in the plates being welded. Thus, for example, U.S. Pat. No. 3,264,731, entitled Bonding Process, by B. Chudzik employs plates that diverge before welding with propogation of an explosive wave in the direction of divergence for progressively driving the two plates together along their extent. The difficulty of such an arrangement in many structural applications should be readily appreciated. Similarly U.S. Pat. No. 3,137,937 employs initially parallel plates with detonation of an explosive layer at one edge of the plate. It is critical in this arrangement that the detonation velocity of the explosive be less than the sonic velocity in the metal to prevent shock wave effects and that the plates be spaced apart so that one is accelerated to high velocity before impact on the other. In one embodiment set forth in this latter patent, a few particles of metal are scattered between the plates to serve as mechanical spacers. These do not form a continuous layer and the spacing between the plates is same as the diameter of the particles, namely about 0.001 to 0.015 inch. The particles do not directly contribute to the bonding.

Thus, in general, detonation has been initiated at one edge of plates to be joined and propagates across the plates at less than the sonic velocity in the plates. Such welding techniques rely on the directional propagation at a carefully selected low velocity to create a "jet" of molten metal at the interface between the plates, thereby freeing the surfaces of contamination and permitting good bonding in areas where a jet actually developes, but leaving poor bonding in general. Another difficulty is in control of detonation velocity in the low order explosives to obtain reproducible results.

When employing a porous layer at the interface, on the other hand, the location of initiation of detonation and detonation velocity of the explosive (so long as high enough to produce a shock wave in metal) are substantially immaterial since there is no reliance on a molten jet, and, in fact, this would appear undesirable in that some of the porous material in the interface might also be displaced by a jet. Bonding instead occurs due to the extreme heating of the porous material in the interface due to shock wave passage therethrough in a direction substantially normal to the layer extent. In effect, according to the present invention, a shock wave occuring substantially over the entire interface of interest is effective to give good bonding. Thus, for example, spot welding can be achieved by propagating a shock through a porous layer normal to its extent in localized areas. Such a shock is readily generated by impact on one of the pieces being welded or by electric discharge as well as by explosive means as has been described. Since the porous material is located in the bonding interface, heat is generated only in the interface region for highest efficiency and the plates merely transmit the energy, in the form of a shock wave, to the porous material in the interface.

The metal plates 15 and 18 may, just for an example, comprise plates of aluminum about ¼ inch thick. The porous layer 17 may comprise, for example, a layer of 20 micron aluminum powder (about 0.00078 inch), having a porosity of about 3. The layer is preferably less than about 1/16 inch thick. The explosive layer may, for example, comprise a ¼ inch thick sheet of any conventional high explosive such as Detasheet available from E. I. duPont de Nemours.

With such an arrangement, upon detonation of the explosive layer 19 a shock of about 250 kilobars is applied to the metal plate 18. Since the detonation velocity of the explosive is substantially higher than the sonic velocity of the metal, the detonation essentially occurs over most of the surface of the plate simultaneously and no matter where initiated, the shock intersects the porous layer at only a small angle away from normal thereto. This shock is in turn transmitted to the porous layer 17 to provide a shock having a peak pressure in the order of about 200 kilobars. A 200 kilobar shock traversing porous aluminum gives a temperature behind the shock in the range of 5,000 to 10,000° Kelvin, depending on the porosity of the aluminum. This is obviously sufficient to melt the powdered aluminum and a thin layer of the aluminum plates 15 and 18. The continuing high pressure of the explosion products from the layer 19 forces the two plates together for a sufficient time for the mass of the metal plates to quench the molten material therebetween and give a strong weld. The weight of gas in the pore spaces of the powder is small compared with the weight of metal and the gas is readily dissolved in the weld metal without embrittlement.

Although in a preferred embodiment the welding has been described for two similar plates of aluminum, it will be apparent to one skilled in the art that the principles are equally applicable to welding of other materials. The technique is particularly adapted to welding of widely dissimilar materials which are not weldable by conventional techniques. When solid bodies of dissimilar materials are to be welded together the porous material therebetween can be the same as one of the bodies to be welded or can be a mixture of powders of the two materials. Likewise, it may be a third material compatible with each of the materials to be welded in order to avoid formation of brittle intermetallic compounds and the like.

Thus, for example, ordinary mild steel can be welded to or clad with stainless steel, nickel, cobalt, molybdenum, tungsten, tantalum, columbium, titanium, zirconium, yttrium, copper, aluminum, magnesium, uranium, beryllium, silver, rare earth metals, precious metals, and alloys thereof. Similarly many other combinations of the above materials are readily provided such as, for example, titanium and tungsten, molybenum and aluminum, beryllium and stainless steel; and many modern high-temperature alloys are also particularly well suited to bonding according to principles of this invention, such as, for example, Nichrome V or Inconel X and molybenum, H-11 steel and Hastelloy C. Metal powders particularly suited for the porous layer include iron, aluminum, copper, nickel, silver, and tantalum. In general, for a given shock strength, the temperature achieved in the porous material is somewhat lower for higher molecular weight materials than for aluminum; however, the temperatures involved are more than sufficient for melting the interface material and small portion of the bodies of solid material to be welded together.

In another embodiment the extreme temperatures and pressures generated in a porous material upon energizing by a shock are employed for accelerating a solid plate to high velocity for determining the equations of state for various materials. In the prior art it has been found that high shock pressures can be induced in a material by explosively driving a thin metal plate to high velocity and impacting it on the material rather than subjecting the material to the direct impact of an explosive detonation wave. However, the maximum velocity obtainable by an explosively driven plate placed on the surface of an explosive is approximately equal to the detonation velocity of the explosive and it is found that the maximum velocity actually obtainable is in the order of 5 kilometers per second. Appreciably higher velocities have been obtained in explosively driven plates by implosive geometries or by interaction of colliding waves resulting in Mach bridges and the like. In general these techniques have been relatively unsatisfactory since the accelerated plates are often not planar.

As pointed out hereinabove, when a strong shock propagates through a porous material, there is often little difference in the density behind the shock relative to that of the normal bulk solid. Since the increase in pressure behind the shock is due largely to an increase in the thermal energy of the material, the resultant energy density may readily be sufficient to vaporize a porous material after passage of the shock and the vaporized material provides an effective accelerating medium for a flat plate.

To a first approximation the maximum velocity of expansion of a shock compressed porous material into a vacuum is given by the equation $$V_m = \left(1 + \sqrt{\frac{2k}{k-1}}\right)V_o$$

where $V_m$ is the maximum velocity of expansion of the vaporized porous material, $V_0$ is the particle velocity of the shock compressed porous material and $k$ is the isentropic exponent. Thus, for example, for an iron or steel plate striking a highly porous aluminum powder at a velocity of about 5 kilometers per second, the pressure behind the shock is about 250 kilobars, the temperature about 13,000° Kelvin, the sonic velocity about 8.4 kilometers per second, the particle velocity 4.5 kilometers per second, and the isentropic exponent 1.3. With such values the velocity of expansion of the vaporized porous material is in the order of about 18 kilometers per second.

This relatively high velocity of expansion illustrates one of the principal advantages of a shocked porous material as compared to a detonating explosive as a propulsive or accelerating medium for a flat plate. In the case of an explosive for the driving medium the sonic velocity is less than the detonation velocity, and the isentropic exponent is about 3. In the case of a shock heated porous material the sonic velocity can be greater than the shock velocity and the isentropic exponent may be only about 1.3, all giving rise to a much greater velocity of expansion. A contributing factor is the relatively low molecular weight of aluminum which gives a high particle velocity for a given thermal energy. Thus it will be apparent that preferred porous materials have low molecular weight after shocking so that a high expansion velocity is obtainable. Thus, in addition to aluminum, other suitable powders include boron and lithium hydride. A practical constraint on the possible powdered materials that can be employed is that they are not dangerously reactive with air in the finely powdered condition which might inhibit ready handling in an apparatus. If the porous material can be handled in vacuum or inert atmosphere, it will be apparent that many other low molecular weight powders can be employed.

Figure 3:
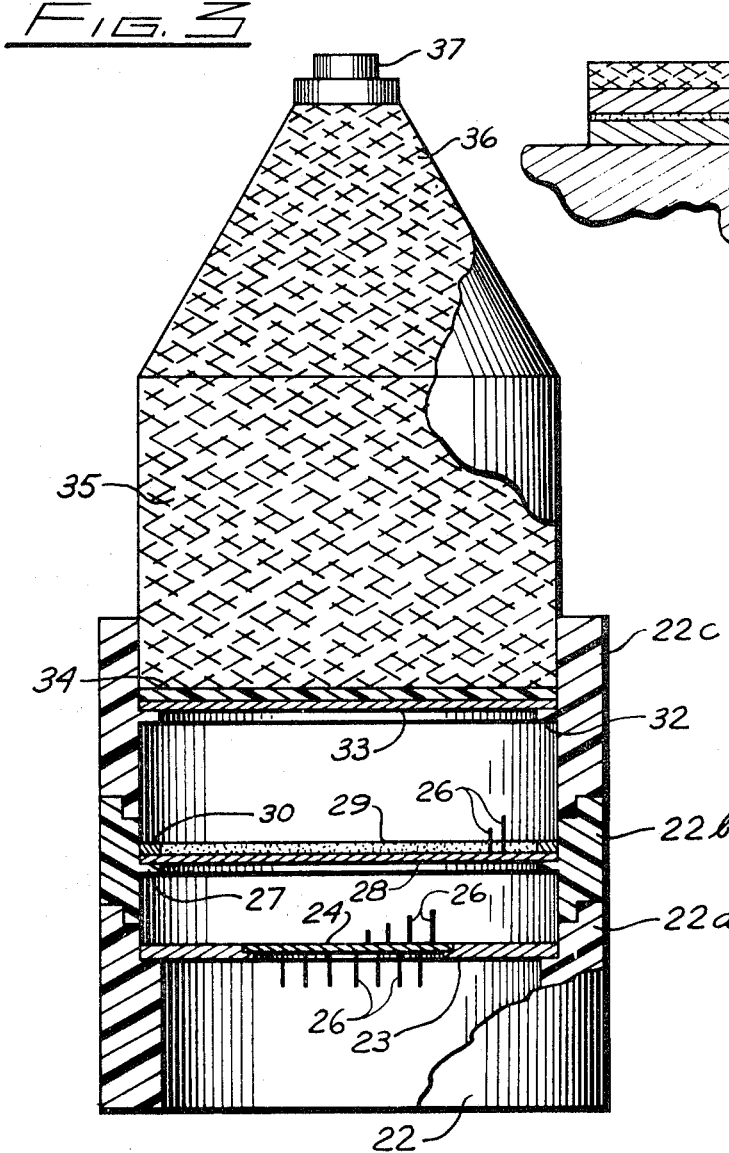
FIG. 3 illustrates application of principles of this invention to apparatus for accelerating a plate to high velocity.

In order to obtain information concerning equations of state, an apparatus as illustrated in FIG. 3 is preferably employed. Broadly, this apparatus provides means for driving a first, relatively thicker, plate at high velocity into a layer of porous metal which is in turn adjacent a second, relatively thinner, plate. The shock from the first plate striking the porous material energizes it and the subsequent expansion of the vaporized porous material drives the second plate towards a target plate at substantially higher velocity than that of the first plate. Measurement of the velocity of the second plate and the shock velocity upon impact of the second plate with a target provides significant data for determining equations of state. It will also be apparent that the second plate can be used as the driver plate in a multistage assembly to achieve progressively higher velocities.

Thus, as illustrated in FIG. 3 there is provided a means for accelerating plates to very high velocity comprising a support structure which is preferably formed of cylindrical plastic pipe 22 which may be cut into three segments as illustrated for each of fabrication and assembly of the device. Supported on a shoulder in the lower segment 22a of the plastic pipe is a target plate support 23 which is preferably a thin metal plate about 8 inches in diameter with about a 4 inch central aperture. Within the aperture is a target plate 24 which is, for example, about 4 inches in diameter and 0.060 inch thick. In a preferred embodiment conventional self-shorting coaxial discharge pins 26 such as Sigma pins manufactured by Daroe Diagnostics Company, are mounted on the target plate 24 for determining the arrival time of shocks. It will be apparent to one skilled in the art that many other instrumentation techniques can be employed for determining shock velocity. Additional self-shorting discharge pins 26 have their effective ends spaced from the surface of the target plate for measuring impact plate velocity, i.e., differing lengths of discharge pins 26 are employed and the time interval between shock arrival at each pin measures velocity.

A shoulder 27 in a center section 22b of the plastic pipe supports a driven impact plate 28 which may, for example, comprise a sheet of low carbon steel 0.025 inch thick. On top of the driven plate 28 is a ⅛ inch thick layer of finely powdered aluminum 29 for providing a porous driving material for the plate 28. A ring 30 at the periphery of the porous layer 29 affords a guide for smoothing and leveling the surface of the powdered aluminum for obtaining a uniform layer thickness. If desired a thin sheet (not shown) of polyethylene terephthalate (Mylar) or other plastic can be stretched over the ring 30 and the surface of the powdered aluminum layer 29 in a drum head arrangement for holding the powdered material in place. Similarly it may be desirable to employ a thin sheet of plastic (not shown) between the powdered aluminum layer 29 and the driven plate 28 for slightly attenuating peak pressure in the shock and preventing plate breakup.

A shoulder 32 in an upper segment 22c of the plastic pipe supports a driver plate 33 which may, for example, comprise a sheet of low carbon steel about ⅛ inch thick. A thin sheet of polyacrylic plastic 34 such as Lucite or Plexiglass is provided on the driver plate 33. The plastic sheet 34 provides a buffer between a block of explosive 35 and the driver plate 33 to prevent plate breakup upon detonation of the explosive. The explosive block 35 may comprise any conventional high explosive and may in a preferred embodiment by a cylinder about 6 inches long and 8 inches in diameter. On the opposite end of the explosive 35 is a conventional explosive plane-wave lens or plane-wave generator which provides a plane detonation wave at its larger end. At the smaller end of the plane-wave lens 36 is a conventional detonator 37.

In operation of the apparatus described and illustrated in FIG. 3, the detonator 37 is initiated causing detonation in the explosive plane-wave lens 36. The plane shock wave at the larger end of the plane-wave lens 36 propagates to the explosive block 35 and theretrhough generating a high energy shock which is applied to the driver plate 33 through the plastic buffer 34. The explosion shears off the shoulder 32 and accelerates the driver plate 33 to a velocity in the order of 5 kilometers per second. The driver plate 33 travels across a gap of about 2 inches and impacts on the porous layer 29 converting it to a high temperature, very dense, high-pressure plasma which accelerates the driven plate 28 to very high velocity after shearing off the shoulder 27. The driven plate 28 travels across a gap of about 1 inch and impacts on the target plate 24. The discharge pins 26 provide a measure of the velocities of the driver and driven plates respectively and also of velocity of the shock transmitted through the target plate.

In the described embodiment the target plate is about 4 inches in diameter and the driver and driven plates are each about 8 inches in diameter. The shoulders supporting the driver and driven plates are sheared off upon operation of the apparatus, however, the planarity of impact of the central area of the plates is not disturbed since disturbances due to the edges cannot propagate very far inwardly in the times involved for flight of the plates 33 and 29 across the narrow gaps. If desired the entire apparatus can be placed in a vacuum chamber (not shown) for removing air from the space between the driven plate and the target plate so that air shocks preceding impact of the driven plate on the target plate do not interfere with the data obtained.

In another arrangement for accelerating a plate to a very high velocity a plurality of layers are employed without necessity of a plate being accelerated across a gap. In this embodiment the pressure or energy density behind a shock front is amplified by propagation through a plurality of self-similar layers of alternating high- and low-density materials. The total energy is not increased but its time distribution is altered for amplifying the energy density at the shock front. Such a means for obtaining such shock amplification is illustrated in FIG. 4. As illustrated therein, there is provided a plurality of high-density layers 40, 40a, 40b, 40c, 40d, each separated from the adjacent high-density layer by one of a group of low-density layers, 41a, 41b, 41c, 41d, so that there are a plurality of high-density and low-density layers in consecutive alternation, that is, between each pair of high-density layers there is a low-density layer and between each pair of low-density layers there is a high-density layer. An end plate 42 is provided at one side of the assemblage or sandwich of layers and may comprise a material similar to the high-density layers or a dissimilar material. An explosive charge 43 together with plane-wave lens 44 and detector 45 as described in connection with the embodiment of FIG. 3 are provided on the opposite side of the assemblage of layers 40 and 41.

The thickness of each successive heavy layer 40 decreases monotonically from the preceding high-density layer in the direction of shock propagation which is normal to the plane of the layers and from the explosive 43 toward the end plate 42. Likewise the thickness of each of the low-density layers decreases monotonically in the direction of shock propagation. Thus, the condition of self-similarity is satisfied if the ratio of the thickness of the first high-density layer 40a to the thickness of the next high-density layer 40b is the same as the ratio of the thicknesses of the second and third heavy layers 40b and 40c respectively. This ratio is also the same for the subsequent layers 40c over 40d and so on. Likewise self-similarity is achieved when the ratio of the first low-density layer 41a to the second low-density 41b is the same as the ratio of the thickness of the second low-density layer 41b to that of the third low-density layer 41c. It is significant that the thickness ratio for the heavy layers is constant and the thickness ratio for the light layers is constant; however, it is not significant whether the thickness ratios for the two types of layers are equal to each other. That is, the light layers may decrease in thickness more or less rapidly than the thickness of the heavy layers and the thickness of corresponding first layers can be unequal. It is preferred that the ratio between thickness of successive layers of either light or dense material be less than about 2.5 so as to avoid undue thickness in the thickest layers in the case where a substantial number of layers is employed.

The end layer 42 can be employed directly for studies of the shock propagation within the end plate or it can be accelerated by the high energy shock towards a target plate (not shown) for study of the shock induced therein upon impact in the same manner as provided in the embodiment of FIG. 3.

In order to get maximum amplification of shock waves, it is preferred to employ a very large density difference between the light and heavy layers. Thus, for example, when the heavy layers are of tungsten and the low-density layers are of powdered aluminum with a porosity of 4, a density ratio in excess of 25 is obtained between the heavy and light layers.

In another embodiment no end plate is employed and the high temperature vaporized material from the porous layer is employed directly for high enthalpy gas flow for aerodynamic testing or as a driver in an expansion tube. Thus as illustrates schematically in FIG. 5 an explosive 46 is employed to accelerate a driver plate 47 which travels across a narrow gap at high velocity and impacts on a layer of porous material 48. The shock induced in the porous layer energizes the porous material 48 and upon reaching the opposite side of the porous layer is reflected as an expansion rarefaction wave. The resultant high enthalpy gas flow, albeit for only a short duration, is directed about a test model 49 either directly or through an expansion nozzle (not shown) for aerodynamic studies. It will be apparent that the final low-density layer in a multilayer structure as illustrated in FIG. 4 can also be employed directly as a high enthalpy gas rather than used to accelerate an end plate.

In the embodiments described and illustrated the initial high-energy shock has been generated by a layer or block of explosive. It will be apparent to one skilled in the art that other shock generating techniques such as impact or electric discharge can also be employed. In regard to impact in particular, it should be noted that a shock amplifier employing a plurality of self-similar layers as described and illustrated in FIG. 4 is a reversible structure. Thus if a shock is directed against the thinnest layer to propagate towards the thickest layer, attenuation of the peak pressure occurs and such a structure is useful for attenuating impact shocks.

Obviously many modifications and variations of the present invention are possible in light of the above teachings. It is therefore to be understood that within the scope of the appended claims the invention may be practiced otherwise than as specifically described.

What is claimed is:

1. Explosive apparatus comprising:
   a first plate;
   a second plate parallel to said first plate;
   a layer of nondetonable solid material containing pore spaces between said first and second plates;
   an explosive on the opposite side of said first plate from said porous material whereby upon detonation of said explosive said first plate acts upon said porous material for sending a shock wave at least through said material for generating high temperature and pressure in said porous material;
   a third plate parallel to said first and second plates, the ratio of thickness of said second plate to thickness of said third plate being the same as the ratio of thickness of said first plate to thickness of said second plate; and
   a second layer of nondetonable solid material containing pore spaces between second and third plates, whereby the strength of a shock transmitted through said plates and layers is increased.

2. Explosive apparatus comprising:
   a first plate;
   a second plate parallel to said first plate;
   a layer of nondetonable solid material containing pore spaces between said first and second plates;
   an explosive on the opposite side of said first plate from said porous material whereby upon detonation of said explosive said first plate acts upon said porous material for sending a shock wave at least through said material for generating high temperature and pressure in said porous material,
   a plurality of additional plates parallel to said first and second plates, the thickness of each successive plate changing monotonically from each preceding plate; and
   a plurality of additional layers of solid material containing pore spaces, in consecutive alternation with said plates, the thickness of each successive layer changing monotonically from each preceding layer.

3. A combination comprising:
a support structure; and seriatim:
a target plate mounted transversely in said support structure;
a drive plate mounted transversely in said support structure and spaced from said target plate;
a layer of highly porous solid material substantially contiguous to said driven plate;
a driver plate mounted transversely in said support structure and spaced from said layer of porous material; and
means for accelerating said driver plate to high velocity for impact on said layer of porous material.

4. A combination as defined in claim 3 wherein said highly porous material comprises finely divided aluminum powder.